3,164,633
ARYLALKYLACYLFORMAMIDINES
David H. Clemens, Willow Grove, Pa., assignor to Rohm & Haas Company, Philadelphia, Pa., a corporation of Delaware
No Drawing. Filed Oct. 19, 1961, Ser. No. 146,337
5 Claims. (Cl. 260—558)

This invention relates to arylalkylacylformamidines of the formula

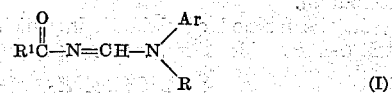

in which R is an aliphatic hydrocarbon group, such as alkyl, $R^1$ is an aryl or alkyl group, and Ar is an aromatic hydrocarbon group, such as an aryl group. The alkyl group which R and $R^1$ may represent may be straight or branched and include the cycloalkyl group. Typical alkyl groups are methyl, ethyl, isopropyl, butyl, 2-ethylhexyl, and the like. When $R^1$ is an aryl group, it preferably represents a phenyl or naphthyl group. Ar preferably represents an aryl group, such as phenyl or naphthyl. Typical of the new arylalkylacylformamidines of the invention are the following:

N-phenyl-N-methyl-N'-benzoylformamidine,
N-phenyl-N-ethyl-N'-benzoylformamidine,
N-phenyl-N-methyl-N'-butyrylformamidine,
N-phenyl-N-methyl-N'-isobutyrylformamidine,
N-phenyl-N-butyl-N'-benzoylformamidine,
N-o-tolyidyl-N-methyl-N'-benzoylformamidine, and the like.

The invention provides a method for preparing the arylalkylacylformamidines which comprises reacting a formamidinium salt of the formula

with an amide of the formula

in the presence of an alkali metal hydride. In the above formulas, Ar, R, and $R^1$ are defined above.

Typical starting formamidinium salts that are reacted with the amides are the following:

N,N'-diphenyl-N,N'-dimethylformamidinium fluoborate,
N,N'-diphenyl-N,N'-diethylformamidinium fluoborate,
N,N'-diphenyl-N,N'-dipropylformamidinium fluoborate,
N,N'-diphenyl-N,N'-di-t-butylformamidinium fluoborate, and
N,N'-di-p-nitrophenyl-N,N'-dimethylformamidinium fluoborate.

Typical amides, which are reacted with the formamidinium salts, are the following: benzamide, propanamide, butyramide, acetamide, and the like.

In the formamidinium salt, the anion, $BF_4$, may be replaced by other anions, such as bromine, iodine, chlorine, ½$SO_4$, and the like.

The alkali metal hydride, MH, which may be used, is a hydride in which M is an alkali metal of an atomic number of 3 to 55, preferably sodium or lithium.

Instead of reacting the formamidinium salt with the amide in the presence of the alkali metal hydride, it is also feasible to react the formamidinium salt with an alkali metal salt of the amide defined above. Accordingly, the method may be carried out by preforming the alkali metal salt of the amide or by preparing it in situ by the use of the amide in the presence of the alkali metal hydride.

In the reaction between the alkali metal salt of the amide, or of the amide in the presence of an alkali metal hydride, and the formamidinium salt, it is preferred to employ one mole of each of the reactants to insure completeness of the reaction. However, there may also be used an excess of the amide, such as two or three moles of the amide for each mole of the formamidinium salt.

The reaction between the formamidinium salt and the amide may be carried out over a broad range of temperatures, such as in the range of 10° to 150° C. and short of the decomposition temperature of the formamidine products. Advantageously, the reaction is carried out in the temperature range of 20° to 35° C. The progress of the reaction may be followed by the disappearance of the formamidinium salts. The process of the invention may be conveniently carried out in the presence of an inert solvent. For this purpose, there may be employed hydrocarbon solvents, such as benzene, toluene, xylene; a chlorinated hydrocarbon, such as ethylene dichloride; ethers, such as 1,2-dimethoxyethane, diethylene glycol, dimethyl ether, tetraethylene glycol dimethyl ether, dibutyl ether, tetrahydrofuran, dioxane, dimethylether, and the like.

The product, when insoluble in the reaction mixture, may be separated by filtration and it may be further purified by washing with water and suitable solvents, such as acetone. If the product is more soluble in the reaction mixture, it may be isolated by adding a water-immiscible solvent, followed by extraction by water, removal of the solvent, as by distillation under reduced pressure, and by crystallization.

The arylalkylacylformamidines of the invention are useful as the active ingredients of pesticidal compositions, particularly as fungicides and herbicides. In standard fungicidal tests, they are toxic to *Alternaria solani*, *Monilinia fructicolia*, and *Stemphylium sarcinaeforme*. As a herbicide, the arylalkylacylformamidines are toxic to wild oats, mustard, and millet. In agricultural applications, the compounds of the invention may be formed in the form of dusts or powders, one or more of the alkylacylformamidines being taken up on a finely divided solid carrier, such as talc. Also, solutions of the formamidines in water-miscible solvents may be prepared. Optionally, emulsifying agents can be added to the liquid to provide self-emulsifying concentrates for preparation of aqueous sprays.

The following examples are provided to further illustrate the invention. They are not to be construed as a limitation thereon. It will be apparent to one skilled in the art that the manipulative steps will generally be substantially identical when equivalent portions of reactants and their equivalents are substituted. All parts are by weight unless indicated to the contrary.

*Example 1(a)*

There is dissolved 4.6 parts of benzamide in 120 parts of 1,2-dimethoxymethane and there is added 1.75 parts of a 53% dispersion of sodium hydride in mineral oil. The mixture is heated to 80° C. until evolution of hydrogen gas ceases. There is then added 12 parts of N,N'-diphenyl-N,N'-dimethylformamidinium fluoborate. The mixture is allowed to stand overnight with stirring and is filtered. The filtrate is evaporated to yield a solid which crystallizes from ether to give 4.2 parts of N-phenyl-N-methyl-N'-benzoylformamidine. The product has a melting point of 62° to 65° C. and analyzes at: 75.08% carbon (theoretical 75.60%), 5.97% hydrogen (theoretical 5.92%), and 11.64% nitrogen (theoretical 11.76%).

*Example 1(b)*

Part (a) is repeated substituting sodium hydride by an equivalent portion of lithium hydride.

Example 2

Example 1(*a*) is repeated substituting 15 parts of N,N'-diphenyl-N,N'-di-n-butylformamidinium fluoborate for the N,N'-diphenyl-N,N'-dimethylformamidinium fluoborate. The product is N-phenyl-N-n-butyl-N'-benzoylformamidine.

Example 3(*a*)

Example 1(*a*) is repeated substituting 2.2 parts of acetamide for the benzamide. The product is N-phenyl-N-methyl-N'-acetylformamidine.

Example 3(*b*)

Part (*a*) is repeated substituting for the acetamide an equivalent portion of the amide for behenic acid. The product is N-phenyl-N-methyl-N'-eicosanylformamidine.

This application is a continuation-in-part of United States application Serial No. 145,736, filed October 17, 1961.

I claim:

1. A method for preparing a compound of the formula

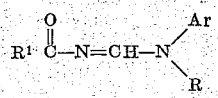

in which R is a lower alkyl group, $R^1$ is selected from the group consisting of a lower alkyl and phenyl, and Ar is an aryl substituent selected from the group consisting of toluidyl, phenyl, naphthyl, and nitrophenyl which comprises reacting an alkali metal salt of an amide of the formula

with a formamidinium salt of the formula

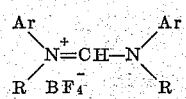

in which R, $R^1$, and Ar are defined above and in which the alkali metal salt has an atomic number of 3 to 55.

2. The process of claim 1, in which $R^1$ is a phenyl group, R is a methyl group, and Ar is a phenyl group.

3. The process of claim 1, in which Ar is a nitrophenyl substituent.

4. The process of claim 1, in which the alkali metal is sodium.

5. The method of claim 1, in which the alkali metal salt of the amide is prepared in situ by reacting the amide

with the formamidinium salt of the formula

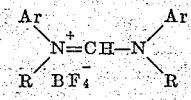

in the presence of an alkali metal hydride, in which the alkali metal has an atomic number of 3 to 55.

References Cited in the file of this patent
FOREIGN PATENTS
840,106 France _____ Apr. 19, 1939